(12) United States Patent
Chang et al.

(10) Patent No.: US 7,832,989 B2
(45) Date of Patent: Nov. 16, 2010

(54) PUMP APPLIED TO FUEL STORAGE DEVICE AND PORTABLE DEVICE WITH FUEL STORAGE DEVICE FOR FUEL CELLS

(75) Inventors: Shung-Huei Chang, Taipei (TW); Shu-Hao Liang, Taipei (TW)

(73) Assignee: Wistron Corporation, Taipei (TW)

( * ) Notice: Subject to any disclaimer, the term of this patent is extended or adjusted under 35 U.S.C. 154(b) by 283 days.

(21) Appl. No.: 12/068,877

(22) Filed: Feb. 13, 2008

(65) Prior Publication Data
US 2009/0148745 A1 Jun. 11, 2009

(30) Foreign Application Priority Data
Dec. 7, 2007 (TW) .............................. 96146814 A

(51) Int. Cl.
*F04B 49/00* (2006.01)
(52) U.S. Cl. ..................... 417/33; 417/15; 417/374; 417/355; 417/425; 417/328; 429/544; 429/545; 429/415
(58) Field of Classification Search ................... 429/34; 415/89; 416/69, 70 R, 170 R, 173; 417/328
See application file for complete search history.

(56) References Cited

U.S. PATENT DOCUMENTS

| 2,736,266 A | * | 2/1956 | Eisele | .................. | 96/214 |
| 2004/0023084 A1 | * | 2/2004 | Sterchi et al. | ................. | 429/13 |

* cited by examiner

*Primary Examiner*—Jennifer K Michener
*Assistant Examiner*—Heng M Chan
(74) *Attorney, Agent, or Firm*—Rosenberg, Klein & Lee

(57) ABSTRACT

The pump comprises a pump body, a control member, an elastic member, and blades. The pump body has a holding space, one or more pump inlets, and one or more pump outlets. The holding space, the pump inlets, and the pump outlets communicate with each other. The pump outlets communicate with a fuel outlet of the fuel storage device; while the pump inlets communicate with a fuel reservoir of the fuel storage device. The control member passes through the fuel storage device and is rotatably set in the holding space. The elastic member is set fixed on the pump body and connects with the control member. The blades are set in the holding space and connect with the control member. Thereby, no extra energy is needed for the pump to transport the fuel from the fuel reservoir to the fuel cell.

18 Claims, 11 Drawing Sheets

US 7,832,989 B2

PUMP APPLIED TO FUEL STORAGE DEVICE AND PORTABLE DEVICE WITH FUEL STORAGE DEVICE FOR FUEL CELLS

FIELD OF THE INVENTION

The present invention relates to a pump, and particularly to a pump applied to a fuel storage device.

BACKGROUND OF THE INVENTION

Fuel cells are highly anticipated nowadays. There are many enterprises investing substantial human resources in the research and development of fuel cells, and some initial exemplary products have been demonstrated. For convenient carry of the fuel cells, currently there exist storage devices of fuel cells, which work like printer ink cartridges and can be replaced when ink therein is exhausted. The storage devices of fuel cells function similar to the printer ink cartridges. There is usually no power device for transporting fuels, but instead, the natural physical phenomena, for example, gravity, or external energy sources, for example, driving force by an external pump, are used for transporting fuels. Using the natural physical phenomena is difficult to achieve the efficiency requirements. Thereby, storage devices of fuels usually adopt external pumps for providing power for transporting fuels.

In general, it is necessary for fuel cells to be fed with continuous fuel supply. The transportation speed of fuels is normally measured in milliliter per minute depending on the generated capacity. Larger storage devices of fuel cells need larger pumps to meet the transportation requirements, which means greater energy is needed for the operation of the pumps.

According to Taiwan Patent Number 1237416, a versatile fuel cartridge of fuel cells for storing methanol and water, methanol/water mixture, or methanol/water mixtures of varying concentrations is disclosed. The fuel cartridge utilizes a filler insert preferably occupying a small portion of the volume of the fuel cartridge. The filler insert is capable of wicking and transporting the fuel to the membrane electrode assembly. Additionally, the filler insert remains in physical contact with the fuel in any orientation of the fuel cartridge and at any fuel level in the fuel cartridge. The fuel cartridge may have more than one chamber, and preferably each chamber contains a different concentration of fuel. Optionally, the fuel cartridge may also include a pump to initiate fuel flow from the fuel reservoir. The pump may also regulate the flow of fuel and importantly to shut off the flow of fuel, when necessary.

However, no matter using a pump set in the fuel storage device or using an external pump for transporting the fuel, energy must be consumed, unless natural physical phenomena are utilized without using extra energy for supplying the pump. This is a considerably bad situation for the whole fuel cell system. Because the design of fuel cells needs to consider the power-generating efficiency of the system. If part of the generated power is used on operating the pump, the efficiency of the fuel cell will definitely be reduced. Besides, the system with an external pump for transporting the fuel adopted currently is complicated and cannot avoid the need of supplying power to the pump. Thereby, if only few or even no power is needed, the operational efficiency of the fuel cells can be improved.

Accordingly, the present invention provides a pump applied to the fuel storage device. When the fuel cell is operating, the mechanical energy stored in advance can be used to supply the fuel transportation power of the fuel without using the power generated by the fuel cells. Hence, the problems described above can be solved.

SUMMARY

An objective of the present invention is to provide a pump applied to the fuel storage device. By connecting an elastic member and a control member as well as by connecting blades and the control member, the elasticity potential energy of the elastic member is released to drive the control member, which, in turn, rotates the blades and the blades can thereby transport the fuel. Thus, no extra energy is needed to achieve the purpose of transporting the fuel.

The pump applied to the fuel storage device is set in a fuel storage device of a fuel cell, and comprises a pump body, a control member, an elastic member, and blades. The pump body is set in the fuel storage device and has a holding space, one or more pump inlets, and one or more pump outlets. The holding space, the pump inlets, and the pump outlets communicate with each other. The pump outlets communicate with a fuel outlet of the fuel storage device; while the pump inlets communicate with a fuel reservoir of the fuel storage device. The control member passes through the fuel storage device and is rotatably set in the holding space. The elastic member is set fixed on the pump body and connects with the control member. The blades are set in the holding space and connect with the control member. By releasing the elasticity potential energy of the elastic member, the blades are driven to rotate and thus transport the fuel. Thereby, no extra energy is needed to transport the fuel.

BRIEF DESCRIPTION OF THE DRAWINGS

FIG. 6A shows a diagram when the portable device is on;

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
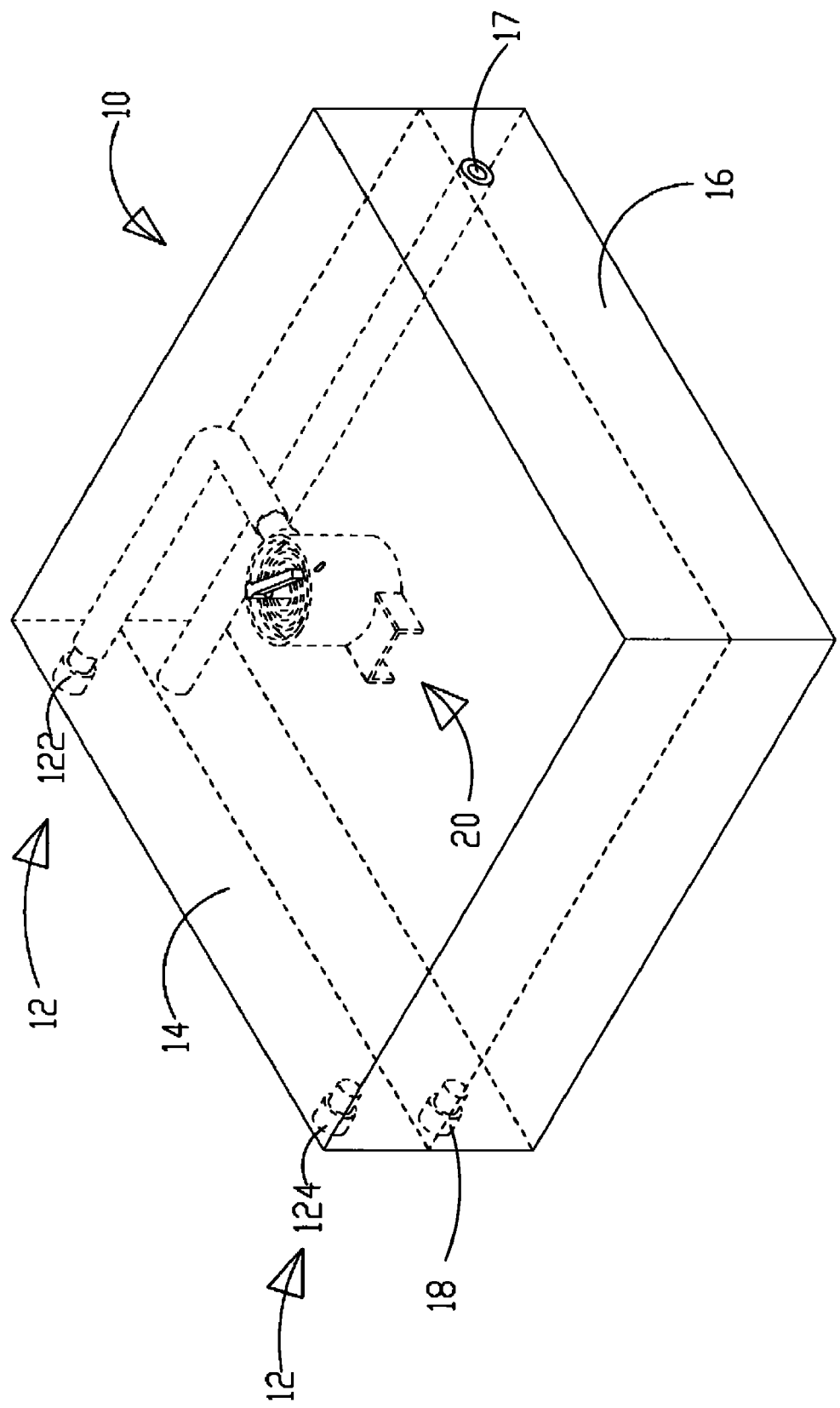
FIG. 1 shows a three-dimensional diagram of the pump applied to the fuel storage device according to a preferred embodiment of the present invention.
Figure 2:
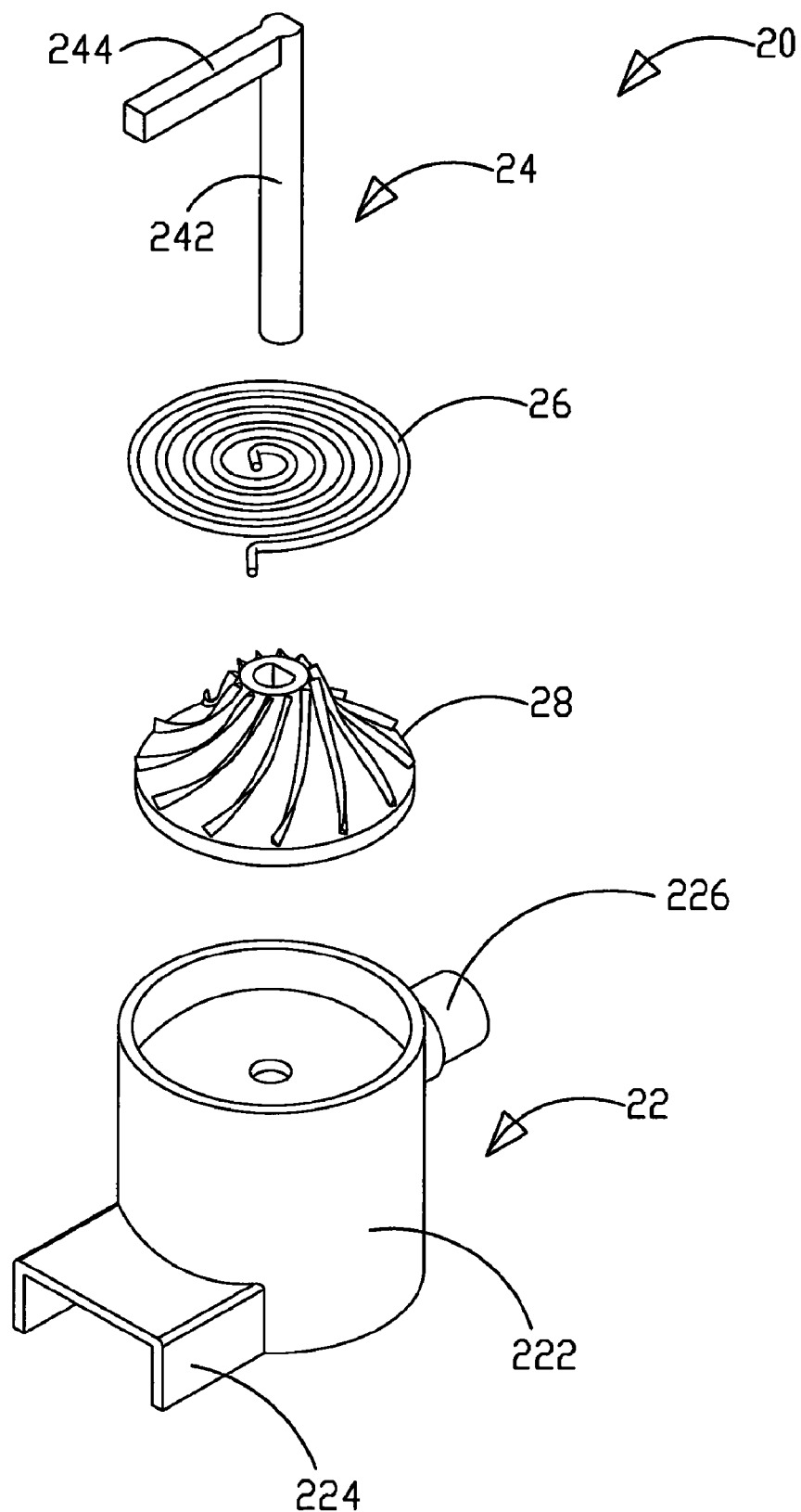
FIG. 2 shows a three-dimensional exploded view of the pump applied to the fuel storage device according to a preferred embodiment of the present invention.
Figure 3A:
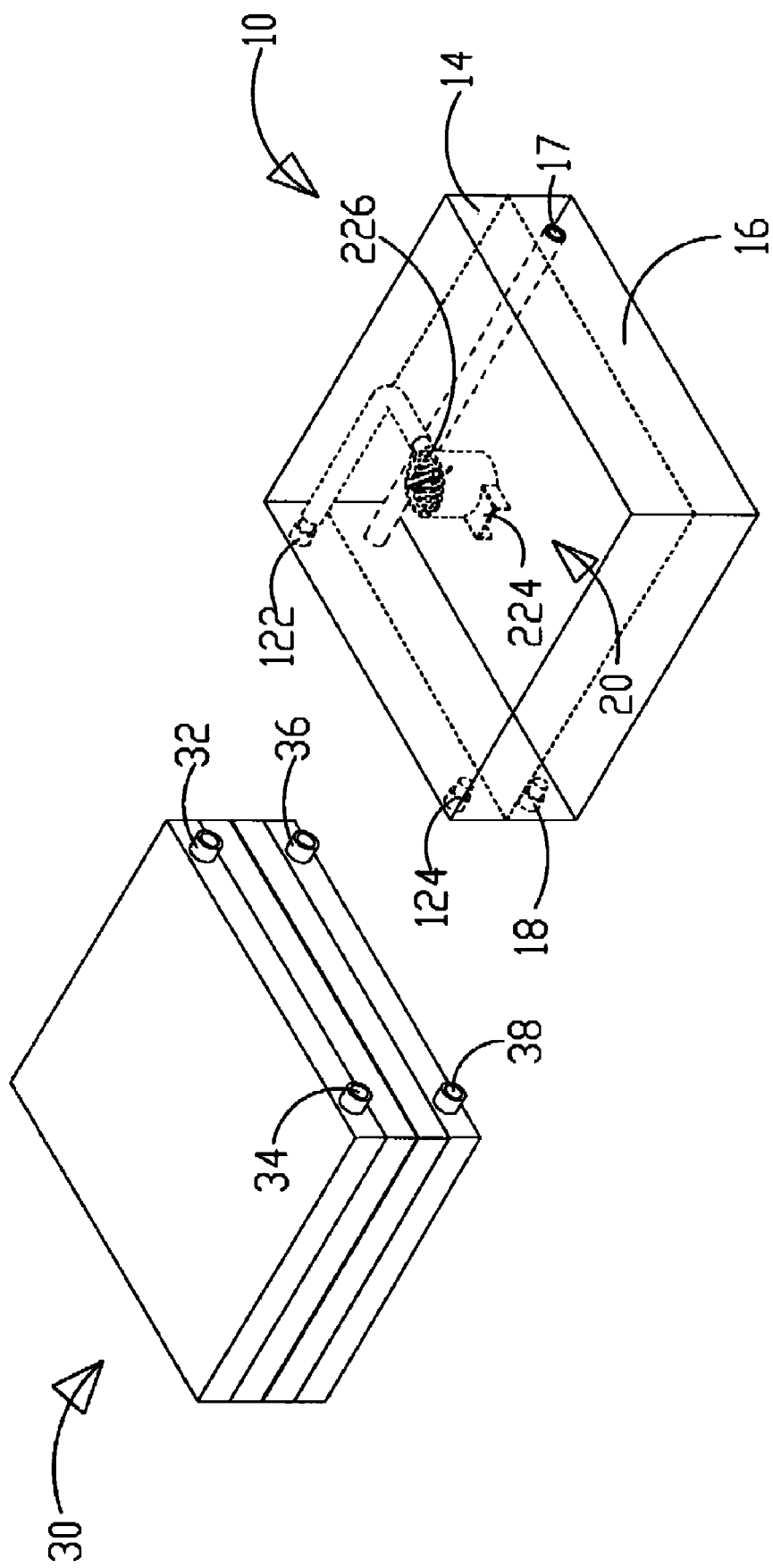
FIG. 3A shows a three-dimensional diagram of the fuel cell assembly before being set with the fuel storage device according to a preferred embodiment of the present invention.
Figure 3B:
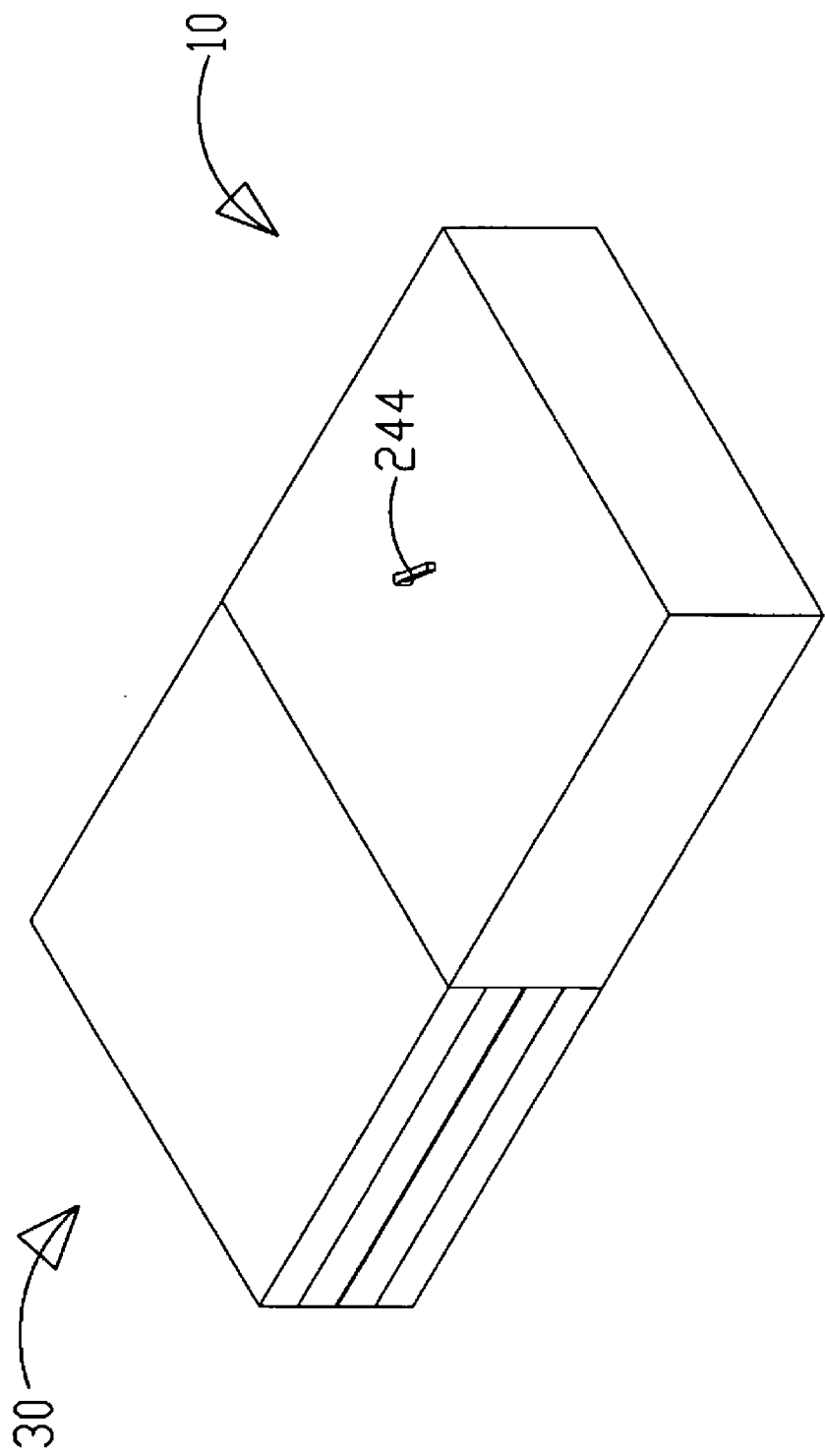
FIG. 3B shows a three-dimensional diagram of the fuel cell assembly after being set with the fuel storage device according to a preferred embodiment of the present invention.

FIG. 1 and FIG. 2 show a three-dimensional diagram and a three-dimensional exploded view of the pump applied to the fuel storage device according to a preferred embodiment of the present invention. In addition, FIGS. 3A and 3B show a three-dimensional diagram of the fuel cell assembly before and after being set with the fuel storage device, respectively, according to a preferred embodiment of the present invention. As shown in FIG. 1, the pump applied to the fuel storage device according to the present invention is adapted in a fuel storage device 10 of a fuel cell 30. FIG. 2 illustrates that the pump 20 comprises a pump body 22, a control member 24, an elastic member 26, and blades 28. The pump body 22 is set in the fuel storage device 10 and has a holding space 222, one or more pump inlets 224, and one or more pump outlets 226. The holding space 222, the pump inlets 224, and the pump outlets 226 communicate with each other. The pump outlets 226 communicate with a fuel outlet 12 of the fuel storage device 10; while the pump inlets 224 communicate with a fuel reservoir 14 of the fuel storage device 10. The control member 24 passes through the fuel storage device 10 and is set in the holding space 222. The elastic member 26 is set fixed on the pump body 22 and connects with the control member 24. The blades 28 are set in the holding space 222 and connect with the control member 24.

The control member 24 according to the present preferred embodiment adopts a control shaft for description. The control member 24 can be other structures. The control shaft according to the present preferred embodiment includes an axis part 242 and a push part 244, which are connected with each other. The axis part 242 is located in the holding space 222. The elastic member 26 is set fixed on the pump body 22 and is connected with the axis part 242. The elastic member 26 includes a volute spring. Thereby, when the pump 20 is to be used, the user rotates the push part 244 to store mechanical potential energy in the elastic member 26. When the user releases the push part 244, the stored mechanical potential energy in the elastic member 26 will be released and turned into kinetic energy to rotate the axis part 242, which, in turn, rotates the blades 28. Hence, by means of the blades 28, the pump 20 can transport the fuel.

The fuel outlet 12 of the fuel storage device 10 includes a first fuel outlet 122 and a second fuel outlet 124. The first fuel outlet 122 communicates with the pump outlet 226; the second fuel outlet 124 communicates with the fuel reservoir 14. When the blades 28 rotate and transport the fuel to the fuel cell 30, the fuel is transported from the first fuel outlet 122 to the fuel cell 30; while the unreacted fuel flows from the second fuel outlet 124 back to the fuel storage device 10.

In addition, the fuel storage device 10 includes an oxidant fluid reservoir 16, which is located on one side of the fuel storage device 10. According to the present preferred embodiment, the oxidant fluid reservoir 16 is located below the fuel reservoir 14. However, it can be set on a different location depending on practical requirements. The fuel storage device 10 includes a through hole 17 and an oxidant fluid inlet 18. The through hole 17 and the oxidant fluid inlet 18 are located on one side of the fuel outlet 12. The through 17 and the oxidant fluid inlet 18 are located on the oxidant fluid reservoir 16. The through hole 17 is used for inputting oxidant fluid such as air or oxygen. The oxidant fluid inlet 18 receives the reacted oxidation products in the fuel cell 30 such as water. Alternatively, the fuel storage device 10 can have only one oxidant fluid inlet 18 for receiving the oxidation products. Optionally, the fuel storage device 10 can have no oxidant fluid reservoir 16.

The fuel cell includes a fuel-guiding inlet 32, a fuel-guiding outlet 34, an oxidant fluid guiding inlet 36, and an oxidant fluid guiding outlet 38. The fuel-guiding inlet 32 is adapted on one end of the fuel cell 30. The fuel-guiding outlet 34 is adapted on one end of the fuel cell and is located on one side of the fuel-guiding inlet 32. The oxidant fluid guiding inlet 36 is adapted on one end of the fuel cell 30 and is located below the fuel-guiding inlet 32. The oxidant fluid guiding outlet 38 is adapted on one end of the fuel cell 30 is located one the same side of the oxidant fluid guiding inlet 36. The oxidant fluid guiding outlet 38 is located below the fuel-guiding outlet 34.

Please refer to FIGS. 3A and 3B. When assembling the fuel storage device 10 to the fuel cell 30, face the fuel-guiding inlet 32 to the first fuel outlet 122, the fuel-guiding outlet 34 to the second fuel outlet 124, the oxidant fluid guiding inlet 36 to the through hole 17, and the oxidant fluid guiding outlet 38 to the oxidant fluid inlet 18, respectively. Thereby, when the fuel cell 30 operates, the fuel is transported by the pump 20 to the first fuel outlet 122 and then to the fuel-guiding inlet 32. The residual fuel after reaction flows back to the second fuel outlet 124 via the fuel-guiding outlet 34. The oxidant fluid is input from the through hole 17, and passes through the oxidant fluid guiding inlet 36 to the fuel cell 30 for reaction. The residual unreacted oxidant fluid and the fluid produced by the reaction, for example, water, flow to the oxidant fluid inlet 18 by way of the oxidant fluid guiding outlet 38, and finally are stored in the oxidant fluid reservoir 16.

Figure 4:
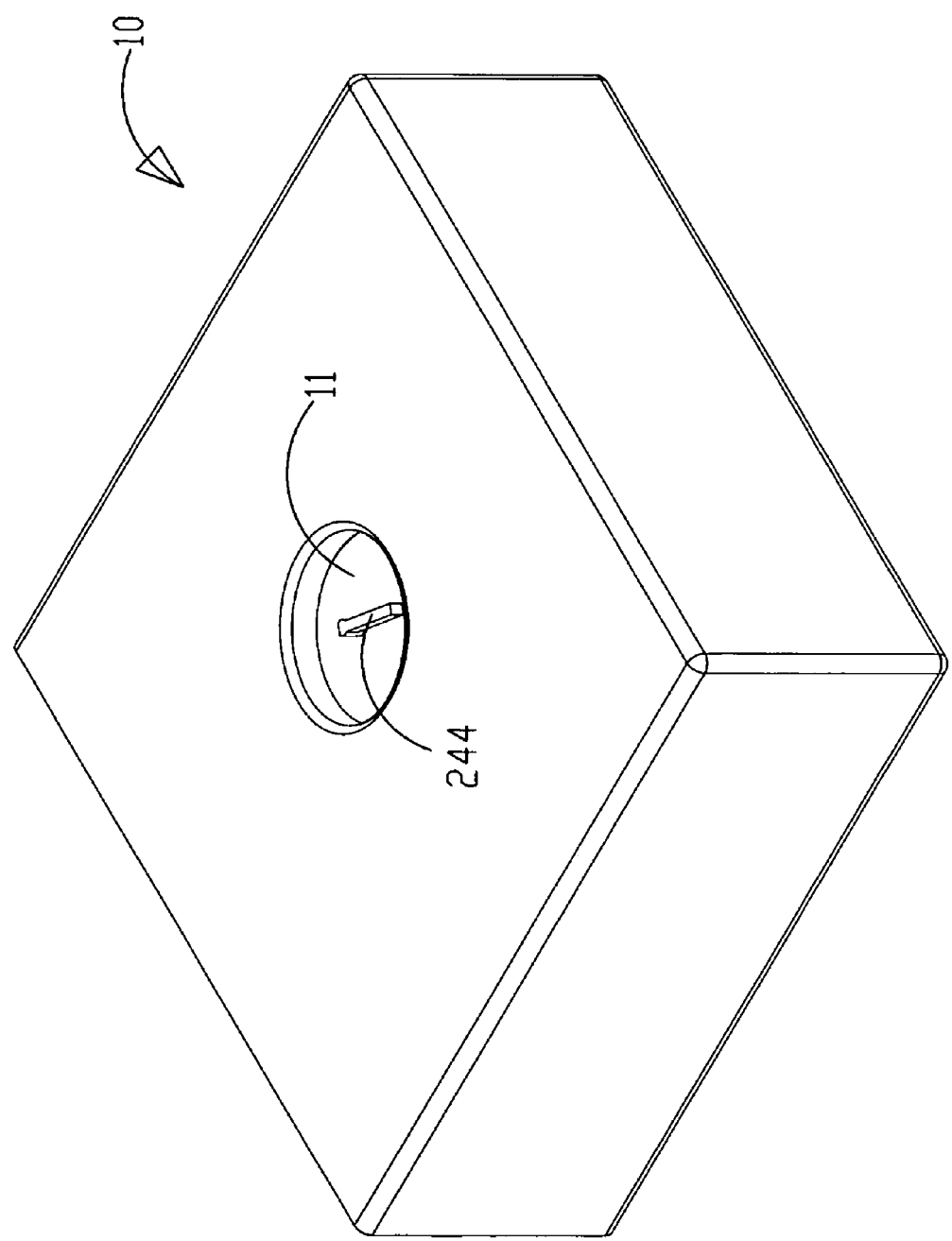
FIG. 4 shows a three-dimensional diagram of the fuel storage device according to another preferred embodiment of the present invention.

According to the present preferred embodiment, a fuel storage device 10 and a fuel cell 30 are assembled in parallel for description. However, the fuel storage device 10 can be assembled according to different requirements of the user. For example, the fuel storage device 10 can be assembled with multiple fuel cells 30 connected in series. Alternatively, the fuel storage device 10 can be assembled with the fuel cell stack, and multiple fuel storage devices 10 can be connected in series with the fuel cell stack. FIG. 4 shows a three-dimensional diagram of the fuel storage device according to another preferred embodiment of the present invention. As shown in the figure, the difference between the present preferred embodiment from the one in FIG. 3B is that according to the present preferred embodiment, a trench 11 is further set in the fuel storage device 10 for improving convenience of the push part 244 during rotation or release. Thereby, the fuel storage device 10 according to the present invention has a trench 11, and the push part 244 is located in the trench 11. Hence, the push part will not stand out of the fuel storage device 10, and will not be interfered by external forces during operation. Consequently, assembly convenience of the fuel storage device to other equipments is enhanced.

Figure 5A:
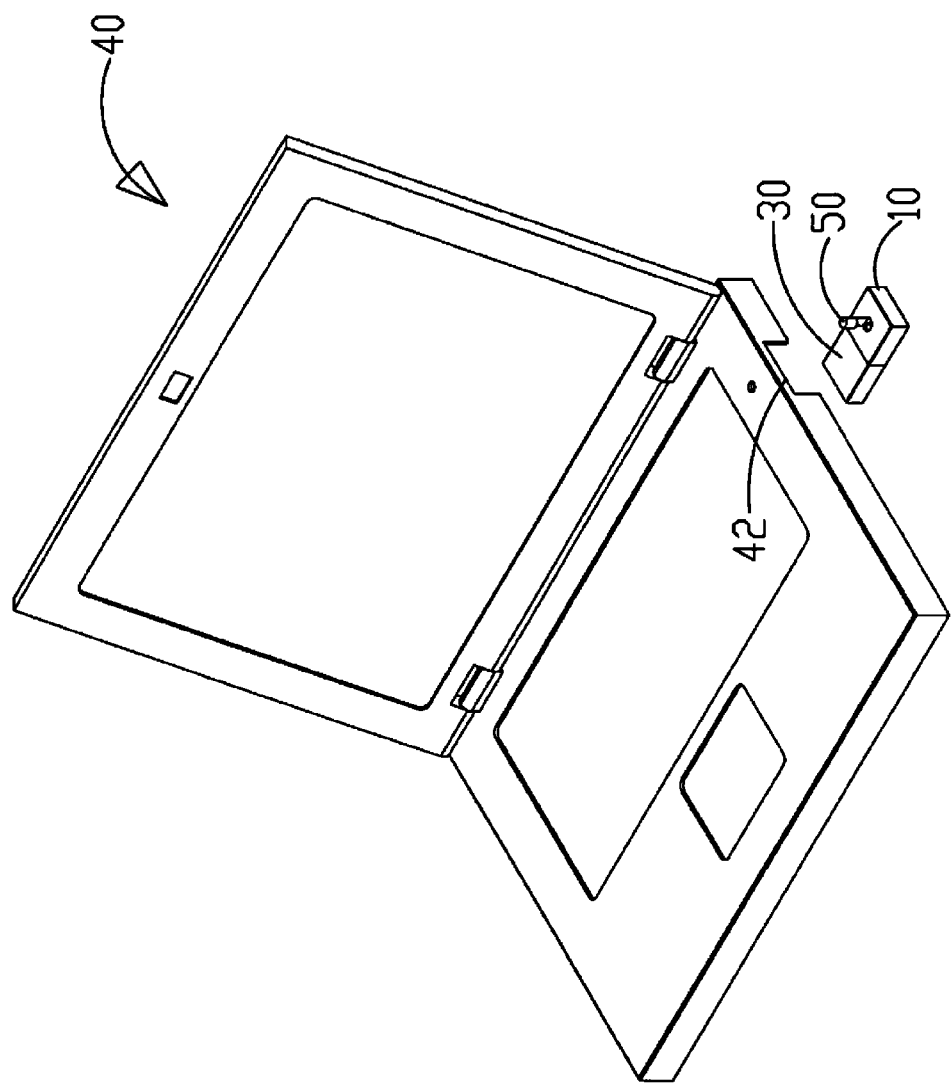
FIG. 5A shows a three-dimensional diagram of the fuel storage device before being set in a portable device according to another preferred embodiment of the present invention.
Figure 5B:
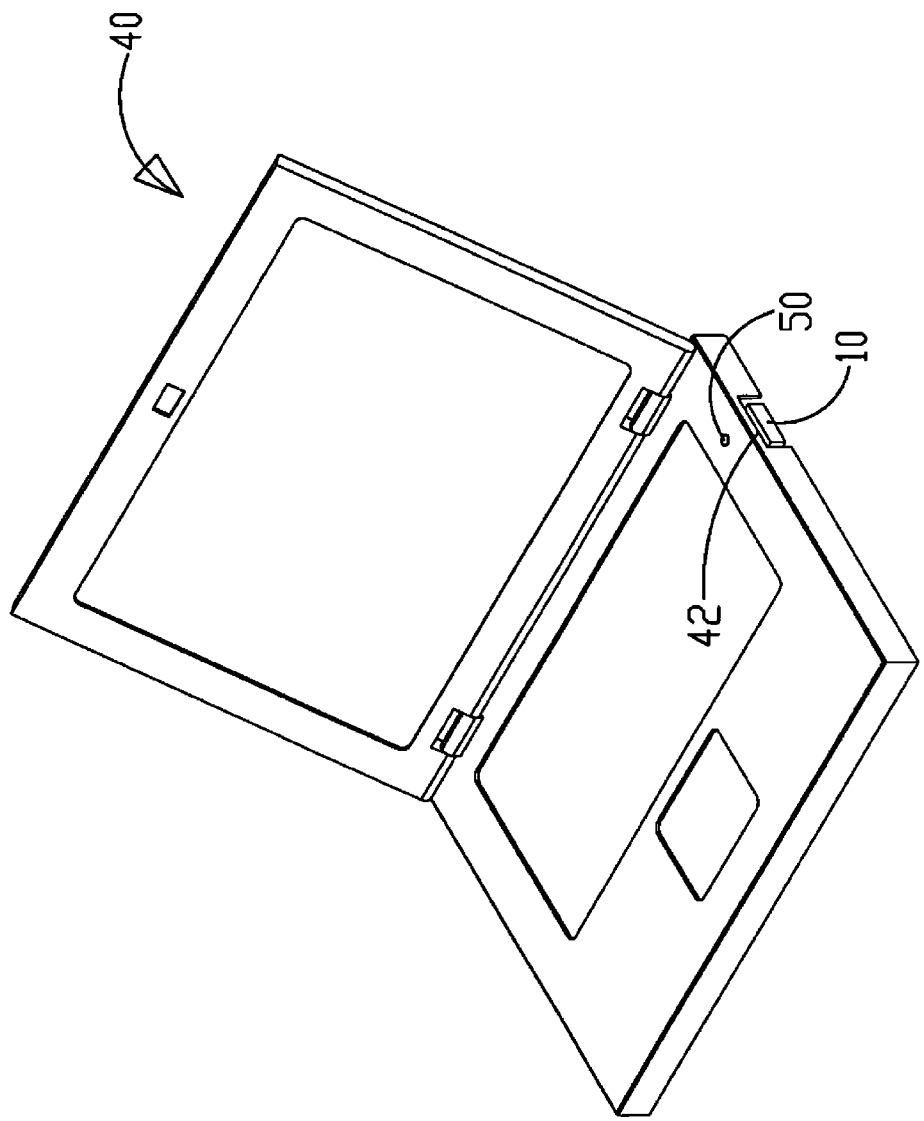
FIG. 5B shows a three-dimensional diagram of the fuel storage device after being set in a portable device according to another preferred embodiment of the present invention.
Figure 6A:
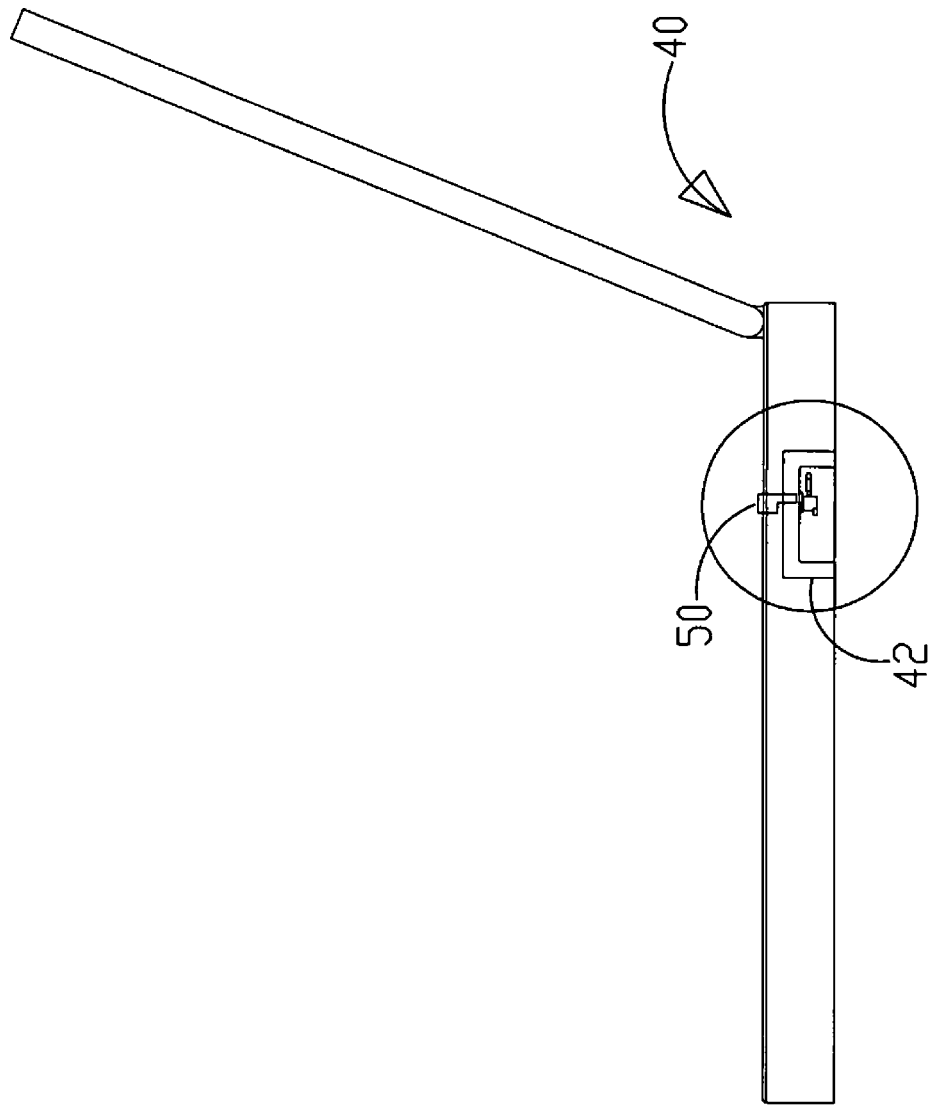
Figure 6B:
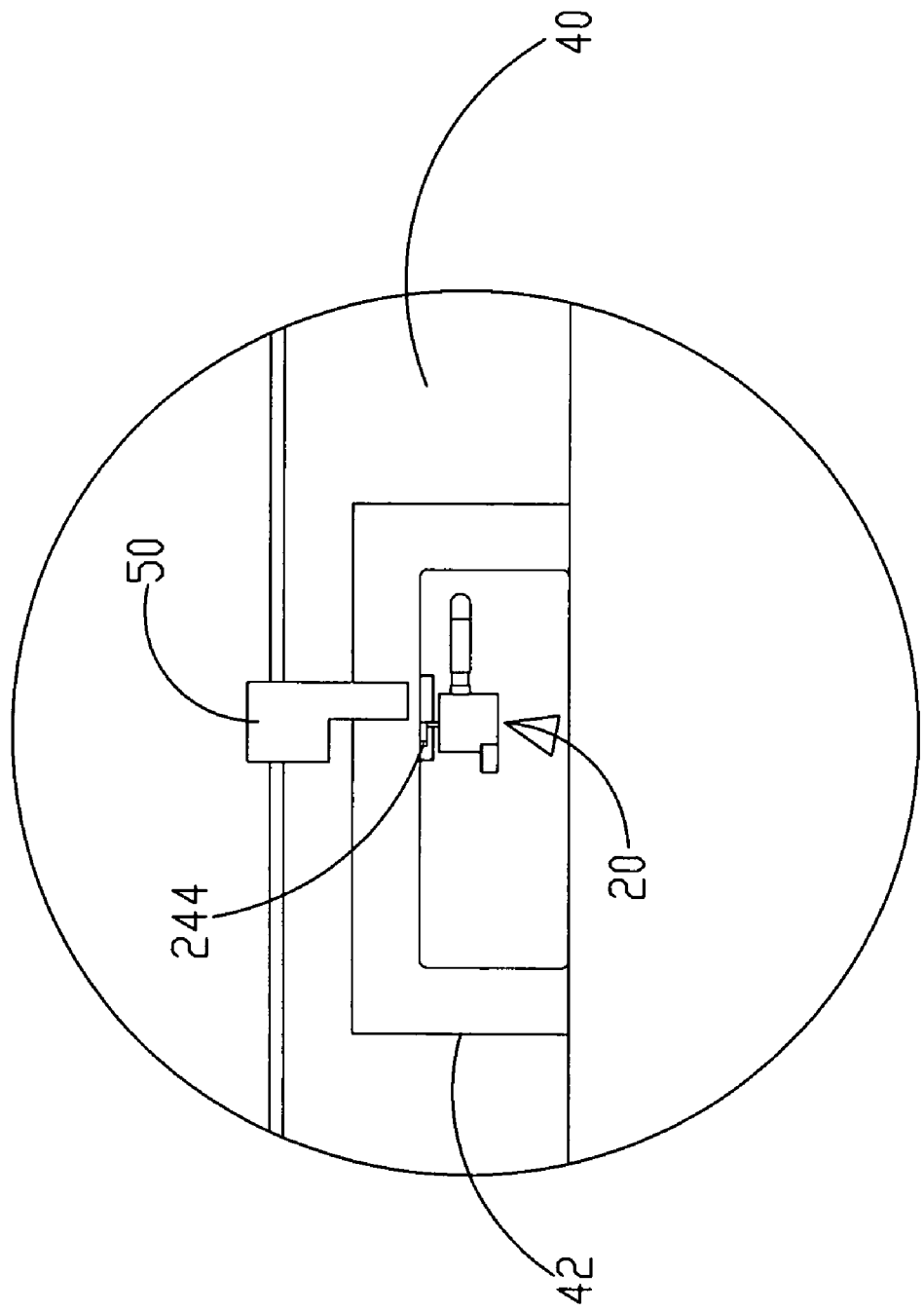
FIG. 6B shows a partial enlarged view of FIG. 6A.
Figure 7A:
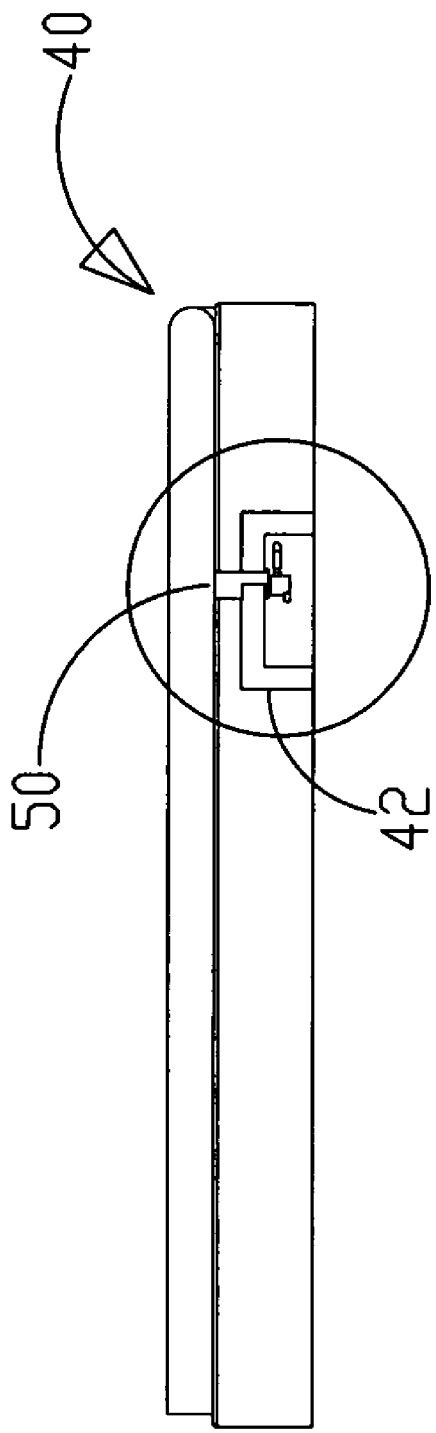
FIG. 7A shows a diagram when the portable device is off.
Figure 7B:
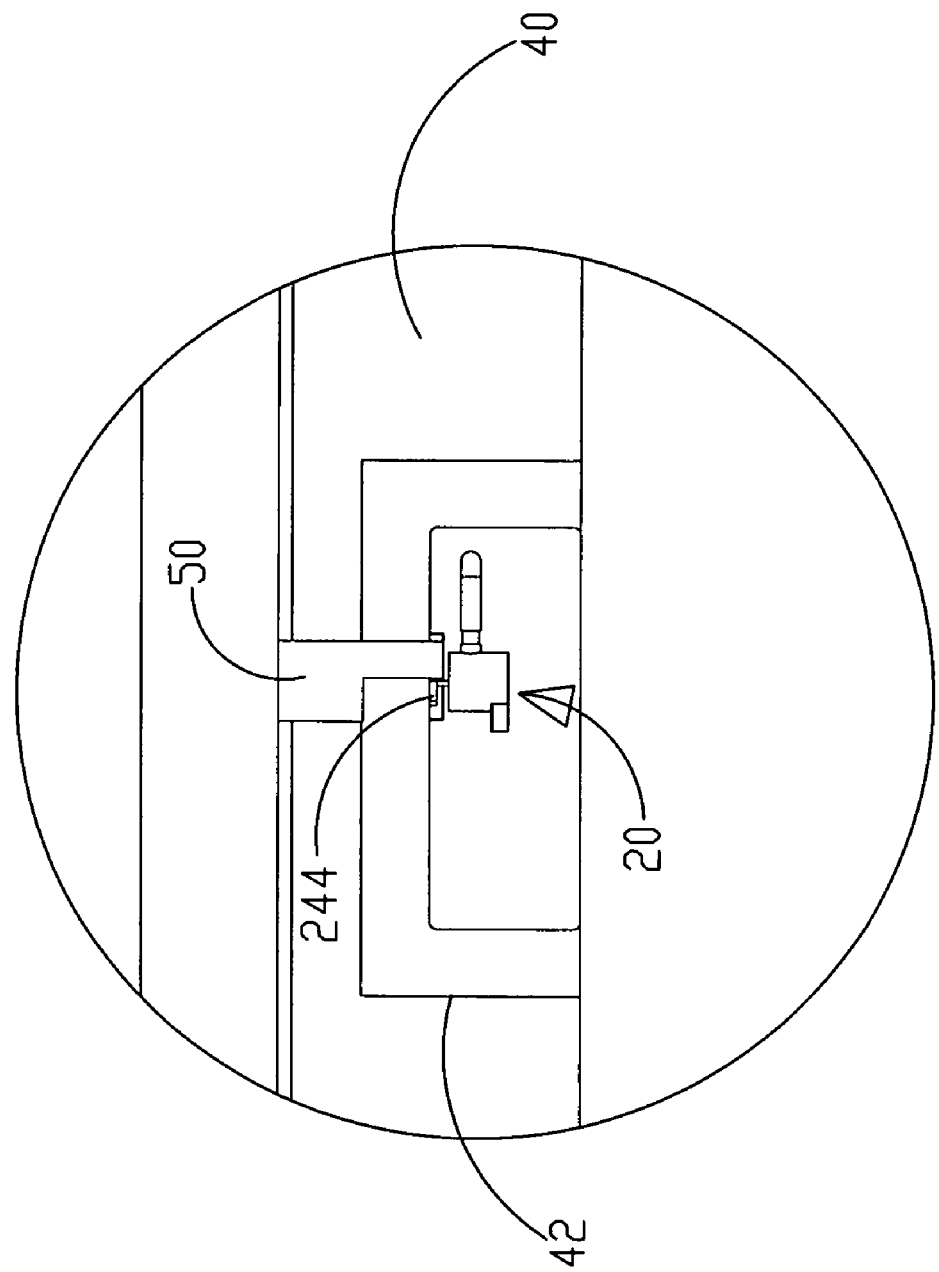
FIG. 7B shows a partial enlarged view of FIG. 7A.

FIG. 5A shows a three-dimensional diagram of the fuel storage device before and after being set in a portable device, respectively, according to another preferred embodiment of the present invention. As shown in the figure, the fuel cell 30 according to the present preferred embodiment is set in a body of a portable device 40. The body of the portable device 40 includes a notebook computer or a cellular phone. According to the present preferred embodiment, a notebook computer is used for description. The fuel cell 30 and the fuel storage device 10 are assembled and adapted in a holding cavity 42 of the body of the portable device 40, and are connected electrically with the body of the portable device 40. FIG. 6A shows a diagram when the portable device is on; FIG. 6B shows a partial enlarged view of FIG. 6A; FIG. 7A shows a diagram when the portable device is off; and FIG. 7B shows a partial enlarged view of FIG. 7A. When the present invention is applied to the body of the portable device 40, a blocker 50 can be set in the body of the portable device 40. The location of the blocker 50 faces the location of the push part 244. The user can turn the push part 244 before assembling to the body of the portable device 40. When the user stops using the body of the portable device 40, the panel of the body of the portable device 40 is closed and presses the blocker 50 to hold against the push part 244. By pressing the blocker 50, the pump 20 stops operating. By stopping rotation of the control member 24 by the blocker 50, the blades 28 can stop rotating, and accordingly the transportation of the fuel to the fuel cell 30 is paused. For example, according to the present preferred embodiment, by pressing and rotation, the blocker 50 holds against the push part 244, and thereby blocks the operation of the pump 20. The blocker 50 can be manual, as shown by the preferred embodiment, or can be electrical switches. The switch function of the blocker 50 will not continuously consume electrical power.

To sum up, the pump applied to the fuel storage device according to the present invention is set in a fuel storage device of a fuel cell. The pump comprises a pump body, a control member, an elastic member, and blades. The pump body is set in the fuel storage device and has a holding space, one or more pump inlets, and one or more pump outlets. The holding space, the pump inlets, and the pump outlets communicate with each other. The control member passes through the fuel storage device and is set in the holding space. The elastic member is set fixed on the pump body and connects with the control member. The blades are set in the holding space and connect with the control member. By releasing the elasticity potential energy of the elastic member, the blades are driven to rotate and thus transport the fuel. Thereby, no extra energy is needed for the pump to transport the fuel from the fuel reservoir to the fuel cell.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A pump, set in a fuel storage device, comprising:
   a pump body, set in the fuel storage device, having a holding space, at least one pump inlet, and at least one pump outlet, wherein the holding space, the at least one pump inlet, and the at least one pump outlet communicate with each other, the at least one pump outlet and a fuel outlet of the fuel storage device communicate with each other, and the at least one pump inlet and a fuel reservoir of the fuel storage device communicate with each other;
   a control shaft, passing through the fuel storage device and set in the holding space;
   an elastic member, set fixed in the pump body and connecting with the control member; and
   blades, set in the holding space and connecting with the control member.

2. The pump of claim 1, wherein the elastic member includes a volute spring.

3. The pump of claim 1, wherein the control shaft includes an axis part and a push part, the axis part connecting with the push part, and the axis part being located in the holding space.

4. The pump of claim 1, wherein the fuel storage device has a trench, and the control member is located in the trench.

5. The pump of claim 1, wherein the fuel outlet of the fuel storage device includes a first fuel outlet and a second fuel outlet, the first fuel outlet communicating with the pump outlet, and the second fuel outlet communicating with the fuel reservoir.

6. The pump of claim 5, wherein the fuel storage device includes a through hole, located on one side of the fuel outlet.

7. The pump of claim 5, wherein the fuel storage device includes an oxidant fluid inlet, located on one side of the fuel outlet.

8. The pump of claim 1, wherein the fuel storage device includes an oxidant reservoir, located on one side of the fuel reservoir.

9. An portable device having a fuel storage device, comprising:
   a holding cavity holding a fuel cell;
   a fuel storage device, assembled with the fuel cell and located in the holding cavity, having a pump, and the pump comprising:
   a pump body, set in the fuel storage device, having a holding space, at least one pump inlet, and at least one pump outlet, wherein the holding space, the at least one pump inlet, and the at least one pump outlet communicate with each other, the at least one pump outlet and a fuel outlet of the fuel storage device communicate with each other, and the at least one pump inlet and a fuel reservoir of the fuel storage device communicate with each other;
   a control shaft, passing through the fuel storage device and set in the holding space;
   a blocker, set in the body of the portable device, the location of the blocker facing the location of the control member;
   an elastic member, set fixed in the pump body and connecting with the control member; and
   blades, set in the holding space and connecting with the control member.

10. The portable device having a fuel storage device of claim 9, wherein the body of the portable device includes a notebook computer.

11. The portable device having a fuel storage device of claim 9, wherein the elastic member includes a volute spring.

12. The portable device having a fuel storage device of claim 9, wherein the control shaft includes an axis part and a push part, the axis part connecting with the push part, and the axis part being located in the holding space.

13. The portable device having a fuel storage device of claim 9, wherein the fuel storage device has a trench, and the control member is located in the trench.

14. The portable device having a fuel storage device of claim 9, wherein the fuel outlet of the fuel storage device includes a first fuel outlet and a second fuel outlet, the first fuel outlet communicating with the pump outlet, and the second fuel outlet communicating with the fuel reservoir.

15. The portable device having a fuel storage device of claim 14, wherein the fuel storage device includes a through hole, located on one side of the fuel outlet.

16. The portable device having a fuel storage device of claim 14, wherein the fuel storage device includes an oxidant fluid inlet, located on one side of the fuel outlet.

17. The portable device having a fuel storage device of claim 9, wherein the fuel storage device includes an oxidant reservoir, located on one side of the fuel reservoir.

18. The portable device having a fuel storage device of claim 9, wherein the fuel cell comprises:
   a fuel-guiding inlet, set on one end of the fuel cell;
   a fuel-guiding outlet, set on one end of the fuel cell and located on one side of the fuel-guiding inlet;
   an oxidant fluid guiding inlet, set on one end of the fuel cell and located below the fuel-guiding inlet; and
   an oxidant fluid guiding outlet, set on one end of the fuel cell and located on the same side of the oxidant fluid guiding inlet and located below the fuel-guiding outlet.

* * * * *